3,539,485
BAKING ENAMELS BASED ON AQUEOUS BINDER FORMULATIONS

Friedrich Gress and Werner Neumann, Ludwigshafen (Rhine), and Erwin Schmidt, Frankenthal, Pfalz, Germany, assignors to Badische Anilin- & Soda-Fabrik Aktiengesellschaft, Ludwigshafen (Rhine), Germany
No Drawing. Filed Aug. 14, 1967, Ser. No. 660,178
Claims priority, application Germany, Aug. 18, 1966, 1,669,075
Int. Cl. C08g *51/24, 51/34*
U.S. Cl. 260—29.3                                   8 Claims

ABSTRACT OF THE DISCLOSURE

Baking enamels compatible with water which contain mixtures of conventional water-compatible aminoplast and/or phenoplast precondensates with special ethers boiling at from 100° to 300° C., particularly from 200° to 300° C., as flow improvers.

---

This invention relates to baking enamels based on aqueous binder formulations containing:

(a) 4.5 to 70, particularly 9 to 50, parts by weight of water-compatible aminoplast precondensates and/or water-compatible phenoplast precondensates;

(b) 95 to 30, particularly 90 to 50, parts by weight of water-compatible alkyd precondensates; and (c) 0.5 to 5, particularly 1 to 4, parts by weight of flow improver. The parts by weight in (a), (b) and (c) adding up to 100.

Baking enamels of this type are known for example from U.S. patent specifications Nos. 2,681,894 and 2,981,710. They usually contain as the flow improver a nonionic wetting agent or a water-compatible organic solvent, such as butanol, ethylene glycol alkyl ethers, white spirit or solvent naphtha.

The conventional flow improvers are usually associated with disadvantages; for example they have to be used in large amounts, they are very expensive and therefore uneconomic, or they unfavourably affect the quality of the enamel (imperviousness, adherence, gloss).

It is an object of the invention to provide baking enamels of the above-mentioned type which contain flow improvers which display their special effect when used in smaller amounts than conventional flow improvers.

It is another object of the invention to provide baking enamels of the said type which contain flow improvers which when used in an amount which is comparable to or less than those used in the prior art give better surface gloss, better levelling of the surface and better bond strength of the enamel layers produced.

Still another object of the invention is to provide baking enamels of the type specified which contain flow improvers that are easier to produce than those of the prior art and make cheaper enamels because of the smaller amount required.

We have found that these objects are achieved with baking enamels which contain special ethers as flow improvers.

A baking enamel based on an aqueous binder formulation in accordance with this invention contains:

(a) 4.5 to 70, particularly 9 to 50, parts by weight of a water-compatible aminoplast precondensate and/or a water-compatible phenoplast precondensate;

(b) 95 to 30, particularly 90 to 50, parts by weight of a water-compatible alkyd precondensate; and (c) 0.5 to 5, particularly 1 to 4, parts by weight of a flow improver. The parts by weight in (a), (b) and (c) adding up to 100.

The baking enamels according to this invention contain as the flow improver an ether having a boiling point (under standard conditions) of 100° to 300° C., particularly 200° to 300° C., and a formula: $R^1$—O—$R^2$ in which $R^1$ and $R^2$ denote identical or different hydrocarbon radicals, particularly alkane radicals or alkene radicals, with the proviso that the ethers have nine to twenty, particularly fourteen to eighteen, carbon atoms in a linear chain or, particularly advantageously, in a branched chain.

The flow improvers are ethers of the above-mentioned type, for example di-2-ethylhexyl ether, 2-ethylhexen-(1)-yl 2-ethylhexyl ether, dodecyl n-butyl ether, di-2-ethyl 4-methylpentyl ether, n-hexyl 2-ethylhexyl ether, dinonyl ether and didecyl ether.

Other suitable ethers are dipentyl(2) ether, dihexyl ether, diisoamyl ether, n-butyl n-heptyl ether, ethyl n-hexyl ether, ethyl n-hexadecyl ether, ethyl penten-(1)-yl-(3) ether or propyl hepten-(2)-yl ether.

A preferred type of baking enamels according to the invention contains as ethers: di-2-ethylhexyl ether, 2-ethylhexen-(1)-yl 2-ethylhexyl ether and/or dodecyl n-butyl ether.

The following details are given concerning the components which make up baking enamels according to this invention:

(a) aminoplast precondensates and/or phenoplast precondensates which are compatible with water; and (b) alkyd precondensates which are compatible with water, may be those conventionally used. They are all well known so that no further details need be given here.

It may simply be stated that typical binder formulations are described for example in Belgian patent specifications Nos. 663,870, 663,875, 643,520 and 664,655.

The baking enamels according to this invention, in addition to the components already mentioned, may contain conventional other components in the conventional amounts.

The baking enamels according to the invention are used in conventional ways, the baking conditions advantageously being 120° to 190° C., particularly 140° to 185° C., for ten to one hundred minutes, particularly from fifteen to sixty minutes. The baking enamels are particularly well suited for coating sheet iron.

The following examples will further illustrate the invention. Parts and percentages specified in the examples are by weight.

EXAMPLE 1

(a) 25 parts of a commercial 70% solution in a mixture of propanol and water of a water-compatible aminoplast precondensate;

(b) 73 parts of a commercial 55% solution of a water-compatible alkyd precondensate in a mixture of glycol ether and water;

(c) 2 parts of di-2-ethylhexyl ether; and (d) 50 parts of water are mixed together.

The resultant baking enamel is applied to deep drawing sheet from which the rust has been removed and which has been degreased. After the coated sheet has been exposed to the air, it is baked at 160° C. for thirty minutes.

The coating thus obtained has excellent bond strength, uniform layer thickness and outstanding gloss and is completely impervious and free from craters.

Comparative experiment:

The procedure of Example 1 is followed except that an equal amount of $C_8$–$C_{15}$ alcohol (a conventional flow improver) is used instead of the di-2-ethylhexyl ether. The coating obtained is less uniform and is covered all over with craters; it is moreover less adherent and therefore less suitable as a priming enamel or coating enamel.

EXAMPLE 2

(a) 25 parts of a commercial 70% solution of a water-compatible aminoplast precondensate in a mixture of propanol and water;

(b) 73 parts of a commercial 55% solution of a water-compatible alkyd precondensate in a mixture of glycol ether and water;

(c) 1.5 parts of dinonyl ether; and (d) 50 parts of water are mixed together.

The resultant baking enamel is applied to deep drawing sheet from which the rust has been removed and which has been degreased. After the coated sheet has been exposed to the air, it is baked for thirty minutes at 160° C.

The coating obtained has excellent bond strength, uniform layer thickness and outstanding gloss and is completely impervious and free from craters.

EXAMPLE 3

(a) 25 parts of a commercial 70% solution of a water-compatible aminoplast precondensate in a mixture of propanol and water;

(b) 73 parts of a commercial 55% solution of a water-compatible alkyd precondensate in a mixture of glycol ether and water;

(c) 1.5 parts of 2-ethylhexen-(1)-yl 2-ethylhexyl ether; and (d) 40 parts of water are mixed together.

The resultant baking enamel is applied to deep drawing sheet from which the rust has been removed and which has been degreased. After the coated sheet has been exposed to the air, it is baked for thirty minutes at 160° C.

The coating thus obtained has excellent bond strength, uniform layer thickness and outstanding gloss and is completely impervious and free from craters.

We claim:

1. A baking enamel having an aqueous binder formulation containing:

(a) 4.5 to 70 parts by weight of at least one of a water-compatible aminoplast precondensate polymer and a water-compatible phenoplast precondensate phenol polymer;

(b) 95 to 30 parts by weight of a water-compatible alkyd precondensate resin;

(c) 0.5 to 5 parts by weight of a flow improver; and (d) water in an amount to provide a flowable baking enamel product, the parts by weight in (a), (b) and (c) adding up to 100, wherein the flow improver is an ether having a boiling point (under standard conditions) of from 100° to 300° C. and a formula: $R^1$—O—$R^2$ in which $R^1$ and $R^2$ denote identical or different hydrocarbon radicals, the ether having a total of nine to twenty carbon atoms.

2. A baking enamel as claimed in claim 1 which contains 9 to 50 parts by weight of component (a), 90 to 50 parts by weight of component (b) and 1 to 4 parts by weight of component (c).

3. A baking enamel as claimed in claim 1 wherein the ether has a boiling point (under standard conditions) of 200° to 300° C.

4. A baking enamel as claimed in claim 1 wherein the ether used is di-2-ethylhexyl ether.

5. A baking enamel as claimed in claim 1 wherein the ether used is 2-ethylhexen-(1)-yl 2-ethylhexyl ether.

6. A baking enamel as claimed in claim 1 wherein the ether used is dodecyl n-butyl ether.

7. A baking enamel as claimed in claim 1 wherein the ether used contains a branched carbon chain.

8. A baking enamel as claimed in claim 1 wherein the ether used has alkyl or alkenyl or both alkyl and alkenyl groups totalling fourteen to eighteen carbon atoms.

References Cited

UNITED STATES PATENTS

| | | | |
|---|---|---|---|
| 2,170,809 | 8/1939 | Coleman et al. | 260—33.2 |
| 2,360,897 | 10/1944 | Sarbach | 260—33.2 |
| 2,413,860 | 1/1947 | Brookes | 260—33.2 |
| 3,242,119 | 3/1966 | Ott et al. | 260—29.4 |
| 3,357,938 | 12/1967 | Eisenwiener | 260—29.3 |
| 3,437,616 | 4/1969 | Nentwig et al. | 260—29.3 |

JOHN C. BLEUTGE, Primary Examiner

U.S. Cl. X.R.

117—161; 260—20, 21, 29.4, 33.2, 842, 850